July 2, 1957 W. STEINMANN 2,797,813
FILTER PRESSES
Filed Aug. 26, 1954 2 Sheets-Sheet 2

INVENTOR
Wilhelm Steinmann
BY
ATTORNEY

United States Patent Office 2,797,813
Patented July 2, 1957

2,797,813
FILTER PRESSES

Wilhelm Steinmann, Vevey, Switzerland, assignor to Ateliers de Constructions Mecaniques de Vevey S. A., Vevey Vaud, Switzerland, a corporation of Switzerland Application August 26, 1954, Serial No. 452,361

Claims priority, application Switzerland September 26, 1953

2 Claims. (Cl. 210—331)

The invention relates to a filter press with a number of filter plates arranged vertically to the axis of the press and spaced apart, wherein the liquid to be filtered is supplied by means of a pump through filters located on said plates, and the outflow passages of the filter plates are connected to at least one outflow passage, through which the filtered liquid flows out, a common casing surrounding all the filter plates. According to my invention means are provided for moving axially the casing surrounding the filter plates, so that the spaces between the filter plates are exposed and in order to set the press in such rapid rotation so that the ejection of the filter residues is effected by centrifugal force.

This filter press serves for example for separating the solid particles (the scum) from the pressure water when treating fish, also for separating flesh from the broth from the fat separator in the treatment of whales, but can also be used for other purposes, for example for separating coal dust, for clarifying waste paper, beer and so forth.

As is well known the manual removal of the filter residues from a filter press is very expensive and associated with a considerable loss of time. The requirement of a filter press, wherein the expensive manual operations can be replaced by mechanical means, is very serious, particularly in cases in which large quantities of filter residues must be removed uniformly. Rotary filter presses are known with automatically closing and opening filter chamber covers. In this construction the filter chambers are closed by covers mounted in hinges. The emptying is effected by mechanical opening of these covers and also by gravity. These filter presses are complicated and not very efficient.

Rotary filters are also available with continuous discharge of the filter residues. In these devices, operating with a vacuum, the solid constituents of the liquid to be clarified are sucked against the rotating filter casing and removed by scrapers. These, however, are not filter presses in the sense of the invention as they do not consist of separate filter plates, and also the liquid to be clarified is not conveyed through the filter plates at a pressure higher than atmospheric. The vacuum pumps required for these filters are very expensive and the dimensions are very large in comparison to the output.

Figure 1:
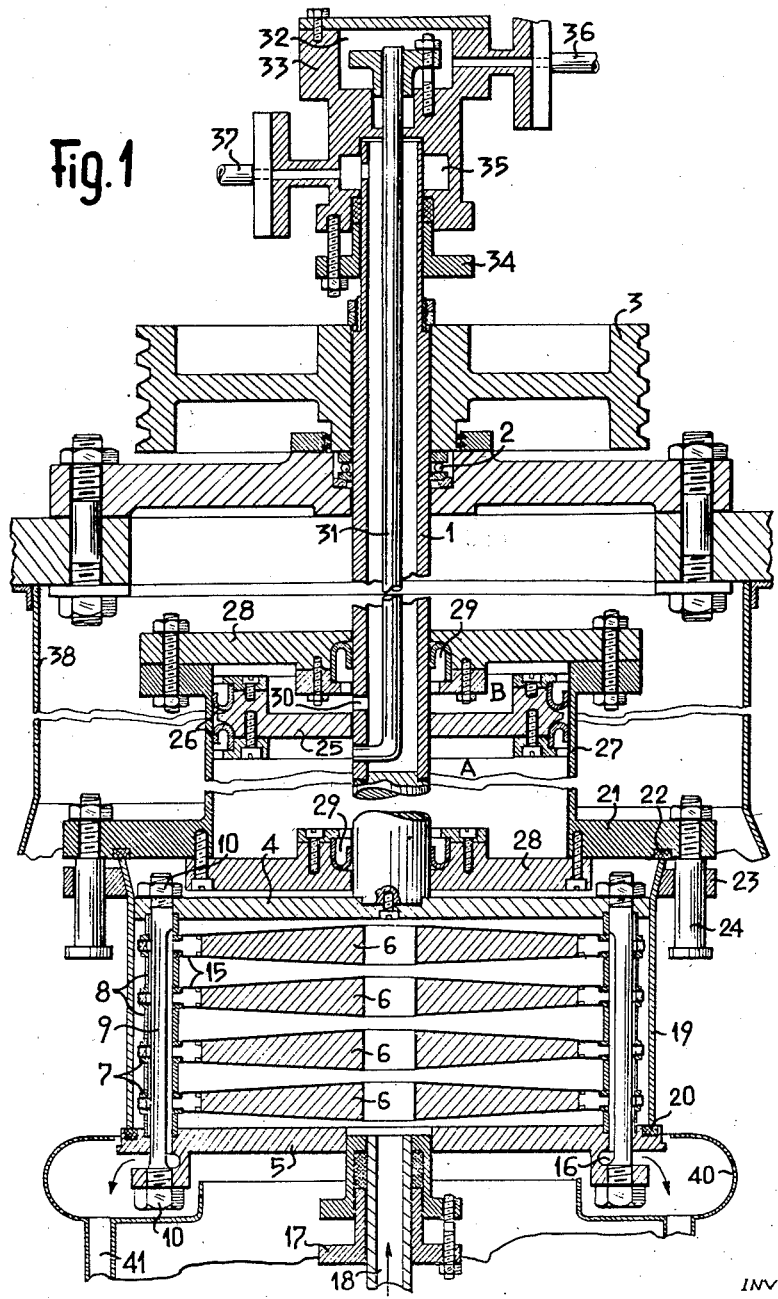
Figure 2:
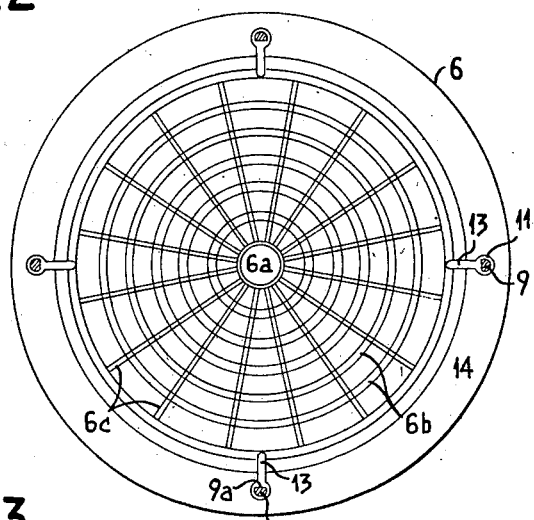
Figure 3:
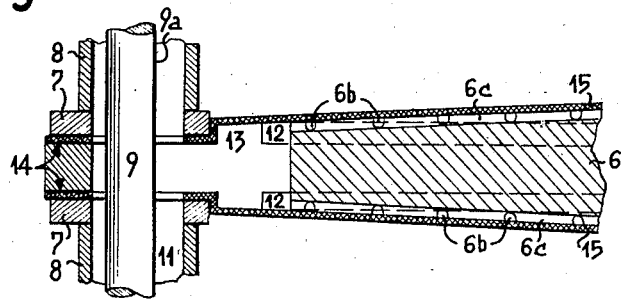
Figure 4:
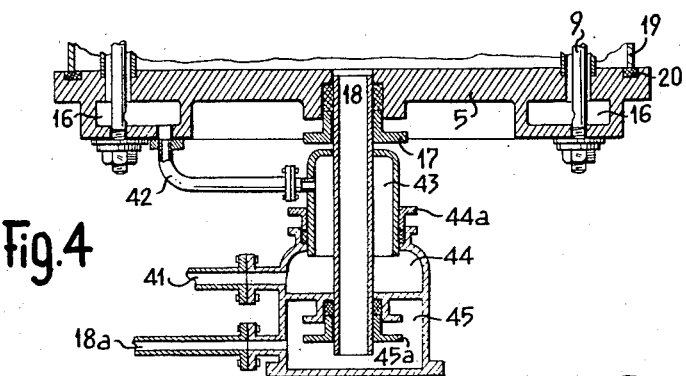

A form of construction of the subject of the invention is shown by way of example in the accompanying drawings, wherein:

Fig. 1 shows the press in section through the axis.
Fig. 2 shows a filter plate in plan.
Fig. 3 shows, to a larger scale, a cross-section of a portion of a filter plate.
Fig. 4 shows a partial view of a modification.

A hollow shaft 1 is pivotally suspended in a ball-bearing 2. It carries a wedge belt pulley 3 by means of which it is set in rotation by a motor, not shown. To the lower end of the shaft is secured the upper bottom 4 of the filter press. Between the bottom 4 and the lower bottom 5 are located four filter plates 6, which are clamped in position by bolts 9 and nuts 10 through the medium of frames 7 and hollow distance pieces 8.

The thickness of the filter plates 6 decreases from the centre thereof towards their periphery.

Each filter plate is provided at the centre with a bore 6a and at the periphery with openings 11 passing therethrough and through which pass bolts 9. The filter plate is provided on its upper surface in the usual manner with passages and on both sides, near its periphery, with annular collecting grooves 12 which are connected to the openings 11 by continuous passages 13.

The passages of the upper surface of the filter plates consist of annular concentrically arranged collecting passages 6b which are connected together and to the collecting grooves 12 by radially arranged outflow grooves 6c. At their periphery the filter plates are provided with inturned packing surfaces 14. The filter cloths 15, located on the filter plates, are provided with openings, corresponding with the openings 11 of the filter plates and are clamped between the frames 7.

As shown in the drawing, a clearance is provided between the bolt 9 and the distance pieces 8 and in addition the bolt 9 is flattened at 9a, so that within the distance pieces, the frame 7 and filter plates are each provided with a downwardly opening outflow passage for the filtered liquid.

The lower bottom 5, the so-called press head, is provided at the centre with a bore with a stuffing box 17, into which projects the filling pipe 18 for the liquid to be clarified into the filter press.

Around the filter plates 6 is provided a casing 19 open at both ends, of which the lower edge is pressed, in the closed position, a packing ring 20 carried by the bottom 5. At the top it is closed tightly by a cover 21 into which is fitted a packing ring 22. The casing 19 is enlarged conically at the top and is provided with short arms 23 through which project connecting members 24 secured to the cover 21 at one end and having at the opposite end a flange owing to the length of members 24 engageable with an arm 23 only after a predetermined position of the upward stroke of cylinder 27. The hollow shaft 1 carries and is rigidly secured to a disc 25 into which are fitted two packing rings 26. Around the disc is arranged, in axial direction, a cylinder 27 of which the lower part is secured rigidly to the cover 21. The two ends of the cylinder 27 are closed tightly by covers 28. These covers are provided at the centre with bores and packed against the shaft 1, passing therethrough, by packing rings 29. The chamber B in the cylinder 27 above the disc 25 is connected by a bore 30 to the hollow space of the shaft 1, whilst the chamber A underneath the disc 25 is connected by a pipe 31, provided in the shaft, to the chamber 32 of a pressure distributor 33, which is provided on the shaft 1 and packed relatively to the latter by the stuffing box 34. The chamber 35 of the pressure distributor 33 communicates with the hollow space of the shaft 1. By pipe lines 36 or 37 a pressure medium such as for example compressed air or liquid under pressure is introduced alternately into the chambers 32 or 35 of the pressure distributor. Around the filter press is arranged a spraying casing 38 which is open at its lower end. Underneath the bottom 5 is provided an annular gutter 40, which is stationary and by means of which the filtered liquid, which flows through the annular passage 16 from the filter press, can be conducted away through the pipe 41.

The method of operation of the filter press is as follows:

A suitable pressure medium is supplied through the pipe 36 into the chamber 32 of the pressure distributor 33 and through the pipe 31 into the chamber A below the disc 25 rigidly secured to hollow shaft 1. As a result the cylinder 27 descends with the cover 21 secured thereto and the casing 19 suspended therefrom until this is pressed by the packing 22 against the packing 20. The liquid to be clarified is now pumped by a pressure pump through the pipe 18 into the filter press. The liquid is forced through the filter cloths 15 drawn over the filter plates 6 and by passing along the passages 6b and grooves 6c of the filter plates into the collecting grooves 12 and thereupon through the passages 13 into the openings 11. From the latter the filtered liquid flows along the bolts 9 and through the annular passage 16 into the gutter 40, from which it is conducted away by the pipe 41. The filter residues collect between the filter plates 6 and gradually reduce the porosity of the filter cloths on the filter plates. As soon as the output of the filter press begins to decrease, the filter stands are removed from the filter press. For this purpose the supply of liquid to be clarified through the pipe 18 is interrupted and pressure liquid is passed through the pipe 37, into the chamber 35 of the pressure distributor 33 and from here into the chamber B of the cylinder 27 over the disc 25. As a result the cylinder 27, with the cover 21 secured thereto, rises together with the casing 19 secured thereto by the connecting member 24. As a result the spaces between the filter plates 6 are exposed. When the filter residues are not such as to flow out of the filter press, the filter press is set in rotation by means of a motor and the rope pulley 3. As a result the filter residues are projected from the filter press by centrifugal force. They fly against the conical spraying casing 38, which is open at the bottom and fall out downwards. The filter press is again stopped and closed, whilst pressure fluid is introduced through the pipe 36 into the chamber 32 of the pressure divider 33 and into the chamber A below the disc 25, whereby the casing 19 descends and again closes the filter press in a fluidtight manner. Thereupon the liquid to be clarified is again supplied to the filter press through the pipe 18 and the filtering operation re-starts.

As the removal of the filter residues can be effected at short intervals of time, the efficiency of the filter surfaces is increased. In general the opening and closing of the filter press, the starting of the motor for rotation of the filter press, and the adjustment of the supply of liquid to be clarified, is effected by its servomotor.

When the filter cloths 15 have to be replaced, the nuts 10 are released and the bottom 5 with the entire set of filter cloths are removed from the filter press. The filter plates and frames can be dismantled and the filter cloths exchanged.

The filter press may also be arranged horizontally.

Instead of the open gutter 16 a closed passage may be provided which is connected by at least one pipe 42 to a chamber 43 rigidly connected to the pipe 18. The chamber 43 leads into a chamber 44 to which is connected the outflow pipe 41. Underneath the chamber 44 is provided a chamber 45 into which leads the supply pipe 18. The liquid to be treated is supplied to the chamber 45 by a pipe 18a. The chambers 44 and 45 are packed relatively to the chamber 43 and the pipe 18 by stuffing boxes 44a and 45a respectively. This arrangement makes it possible, even during the rotation of the filter press to effect a backward rinsing in order to clean the filter cloths 15. In this case the cleaning liquid is supplied through the pipe 41 under pressure, and it is conducted away through the pipes 18 and 18a.

Compressed air may also be conducted through the pipe 41, whereby press residues may be removed from the filters and thereby the emptying is facilitated.

I claim:

1. In a pressure filter, the combination comprising a stationary frame, a hollow shaft journaled in the frame, a piston rigidly secured to the shaft, a cylinder slidable on the piston and moved in one direction by pressure fluid admitted into the cylinder and to one side of the piston through the hollow shaft, a pipe within the shaft and opening through the wall thereof on the other side of the piston and supplying pressure fluid for moving the cylinder in the opposite direction, operable means rigid with the shaft for rotating same, a support fixed to the shaft and rotatable therewith, a plurality of plates mounted in the support in spaced relation to one another, filters supported by the plates, a supply conduit supplying liquid to be filtered to the interior of the support, a casing surrounding the support in liquid tight relation thereto and separable therefrom and by a lost motion connection connected at one end to the adjacent end of the cylinder and closed at that end by said adjacent end of the cylinder upon completion of the stroke of the cylinder in the second direction, the end of the casing adjacent the cylinder being opened after a predetermined part of the cylinder stroke in the first direction, and the casing thereafter being slidably separated from the support to expose same, the plates and filters for removing the filtration residues by centrifugal action or gravity.

2. The combination according to claim 1, and wherein the support comprises two end covers, bolts securing the covers, spacing means surrounding the bolts and securing the plates and filter cloths, and wherein each bolt, its plates, spacing means and filter cloths constitute a passage, and the spaces between an end cover and adjacent plates and between the plates are in direct communication with the supply conduit, and also comprising a drainage conduit connected to the passages.

References Cited in the file of this patent

UNITED STATES PATENTS

| | | |
|---|---|---|
| 1,190,842 | Atkins et al. | July 11, 1916 |
| 1,670,319 | Sweetland | May 22, 1928 |
| 2,538,575 | Kracklauer | Jan. 16, 1951 |